US 11,440,182 B2
United States Patent
Kawanami

(10) Patent No.: US 11,440,182 B2
(45) Date of Patent: Sep. 13, 2022

(54) EXPANSION DEVICE AND MOVABLE BODY

(71) Applicant: SONY CORPORATION, Tokyo (JP)

(72) Inventor: Yasunori Kawanami, Tokyo (JP)

(73) Assignee: SONY CORPORATION, Tokyo (JP)

(*) Notice: Subject to any disclaimer, the term of this patent is extended or adjusted under 35 U.S.C. 154(b) by 231 days.

(21) Appl. No.: 16/493,428

(22) PCT Filed: Jan. 25, 2018

(86) PCT No.: PCT/JP2018/002179
§ 371 (c)(1),
(2) Date: Sep. 12, 2019

(87) PCT Pub. No.: WO2018/198452
PCT Pub. Date: Nov. 1, 2018

(65) Prior Publication Data
US 2020/0130174 A1   Apr. 30, 2020

(30) Foreign Application Priority Data

Apr. 25, 2017 (JP) .............................. JP2017-085999

(51) Int. Cl.
B25J 9/10 (2006.01)
B25J 18/02 (2006.01)
(Continued)

(52) U.S. Cl.
CPC .............. B25J 9/1045 (2013.01); B25J 9/104 (2013.01); B25J 18/02 (2013.01); B25J 17/00 (2013.01); B25J 19/02 (2013.01)

(58) Field of Classification Search
CPC . B25J 9/042; B25J 9/104; B25J 9/1045; B25J 9/106; B25J 18/02; B62D 57/032
(Continued)

(56) References Cited

U.S. PATENT DOCUMENTS 4,283,165 A * 8/1981 Vertut ...................... B25J 5/007
280/771
5,297,443 A * 3/1994 Wentz ...................... B25J 15/12
74/490.04

(Continued)

FOREIGN PATENT DOCUMENTS

CN    103625572 A    3/2014
DE    69831695 T2    7/2006
(Continued)

OTHER PUBLICATIONS

A. Spröwitz et al. Kinematic primitives for walking and trotting gaits of a quadruped robot with compliant legs, in Frontiers in Computational Neuroscience, vol. 8, No. 27, p. 1-13, 2014. (Year: 2014).*

(Continued)

Primary Examiner — Joseph Brown
(74) Attorney, Agent, or Firm — Chip Law Group

(57) ABSTRACT

To provide an expansion device and a movable body including a mechanism for quick deformation. An expansion device includes a main body and a limb portion attached to the main body, in which the limb portion includes a main link connected to the main body via a joint, an end link provided at a front end of the limb portion, at least one or more limb joints that are interposed between the main link and the end link and connect the main link and the end link, and a linear member of which both ends couple an end at the front end side of the limb portion of the end link and the main body and are retractable to one or both of the end link and the main body.

7 Claims, 12 Drawing Sheets

(51) Int. Cl.
  *B25J 17/00* (2006.01)
  *B25J 19/02* (2006.01)
(58) Field of Classification Search
  USPC .............. 74/490.04; 901/21; 180/8.6; 305/3
  See application file for complete search history.

(56) References Cited

U.S. PATENT DOCUMENTS

| | | | |
|---|---|---|---|
| 5,857,648 A | 1/1999 | Dailey et al. | |
| 7,407,208 B2* | 8/2008 | Tadano | B25J 9/104 294/111 |
| 8,523,509 B2* | 9/2013 | Park | B25J 9/104 414/736 |
| 2009/0001919 A1 | 1/2009 | Tsusaka | |
| 2010/0011899 A1* | 1/2010 | Kim | B25J 9/104 74/490.04 |

FOREIGN PATENT DOCUMENTS

| | | |
|---|---|---|
| EP | 0858946 A1 | 8/1998 |
| EP | 1798006 A1 | 6/2007 |
| JP | 06-065388 U | 9/1994 |
| JP | 10-338200 A | 12/1998 |
| JP | 2006-035325 A | 2/2006 |
| JP | 2007-000957 A | 1/2007 |
| JP | 2010-131367 A | 6/2010 |
| JP | 2011-255467 A | 12/2011 |
| JP | 2016-117118 A | 6/2016 |
| WO | 2006/009317 A1 | 1/2006 |

OTHER PUBLICATIONS

Kawasaki, et al., "Small Quadruped Robot with Bi-articular Muscle-Tendon Complex: Development of flexible spine", The Proceedings of JSME annual Conference on Robotics and Mechatronics, vol. 16, No. 6, Jun. 8-11, 2016, 04 pages.

International Search Report and Written Opinion of PCT Application No. PCT/JP2018/002179, dated Apr. 24, 2018, 13 pages of ISRWO.

Kawasaki, et al., "Small Quadruped Robot with Bi-articular Muscle-Tendon Complex", Development of Flexible Spine, Proceedings of JSME Conference on Robotics and Mechatronics, vol. 16, No. 2, Yokohama, Japan, Jun. 8-13, 2016, pp. 2A2-12a2(1) to 2A2-12a2(4).

Kawasaki, et al., "Small Quadruped Robot with Bi-articular Muscle-Tendon Complex", Development of Flexible Spine, JSME Conference on Robotics and Mechatronics, vol. 16, No. 2, Yokohama, Japan, Jun. 8-13, 2016, pp. 2A2-12a2(1) to 2A2-12a2(4).

* cited by examiner

EXPANSION DEVICE AND MOVABLE BODY

CROSS REFERENCE TO RELATED APPLICATIONS

This application is a U.S. National Phase of International Patent Application No. PCT/JP2018/002179 filed on Jan. 25, 2018, which claims priority benefit of Japanese Patent Application No. JP 2017-085999 filed in the Japan Patent Office on Apr. 25, 2017. Each of the above-referenced applications is hereby incorporated herein by reference in its entirety.

TECHNICAL FIELD

The present disclosure relates to an expansion device and a movable body.

BACKGROUND ART

In recent years, a robot device including a plurality of joints which can be freely driven by a driving motor and the like has been actively developed. Since the robot device including the plurality of joints has a large number of movable parts, an outer shape or a form of the robot device can be largely deformed as a transformable device described in Patent Document 1 below.

Specifically, Patent Document 1 described below discloses a transformable toy which changes so as to instantly jump out to a state of a character's shape from a state where the toy is folded into a plate-like shape.

CITATION LIST

Patent Document

Patent Document 1: Japanese Patent Application Laid-Open No. 2010-131367

SUMMARY OF THE INVENTION

Problems to be Solved by the Invention

However, since the transformable device described in Patent Document 1 is a toy, an object of the deformation of the transformable device is to enhance character's property and entertain a user. Furthermore, a size of the transformable device described in Patent Document 1 has been limited to a size that can be folded by a user's hand and deformed. Therefore, in a large robot device such as an industrial robot and a service robot for assisting human works, it has been necessary to consider a deformation mechanism made for a more practical object.

Therefore, in the present disclosure, a novel and modified expansion device and movable body including a mechanism for quick deformation are proposed.

Solutions to Problems

According to the present disclosure, an expansion device is provided which includes a main body and a limb portion attached to the main body, in which the limb portion includes a main link connected to the main body via a joint, an end link provided at a front end of the limb portion, at least one or more limb joints that are interposed between the main link and the end link and connect the main link and the end link, and a linear member of which both ends couple an end at the front end side of the limb portion of the end link and the main body and are retractable to one or both of the end link and the main body.

Furthermore, according to the present disclosure, a movable body is provided which includes a movable body main body and at least two or more limb portions attached to the movable body main body, in which each of the limb portions includes a main link connected to the movable body main body via a joint, an end link provided at a front end of the limb portion, at least one or more limb joints that are interposed between the main link and the end link and connect the main link and the end link, and a linear member of which both ends couple an end at the front end side of the limb portion of the end link and the movable body main body and are retractable to one or both of the end link and the movable body main body.

According to the present disclosure, since the movable body can be quickly deformed into a form which can suppress a damage due to a drop and the like, the damage caused by falling at the time of an operation can be suppressed. Furthermore, according to the present disclosure, the movable body can be deformed into a space-saving and small outer shape which can be easily housed or transported, for example.

Effects of the Invention

As described above, according to the present disclosure, an expansion device and a movable body improving practicability can be provided.

Note that the above effects are not necessarily limited, and any effect that has been described in the present specification or other effect which may be found from the present specification may be obtained together with or instead of the above effects.

MODE FOR CARRYING OUT THE INVENTION

Figure 1:
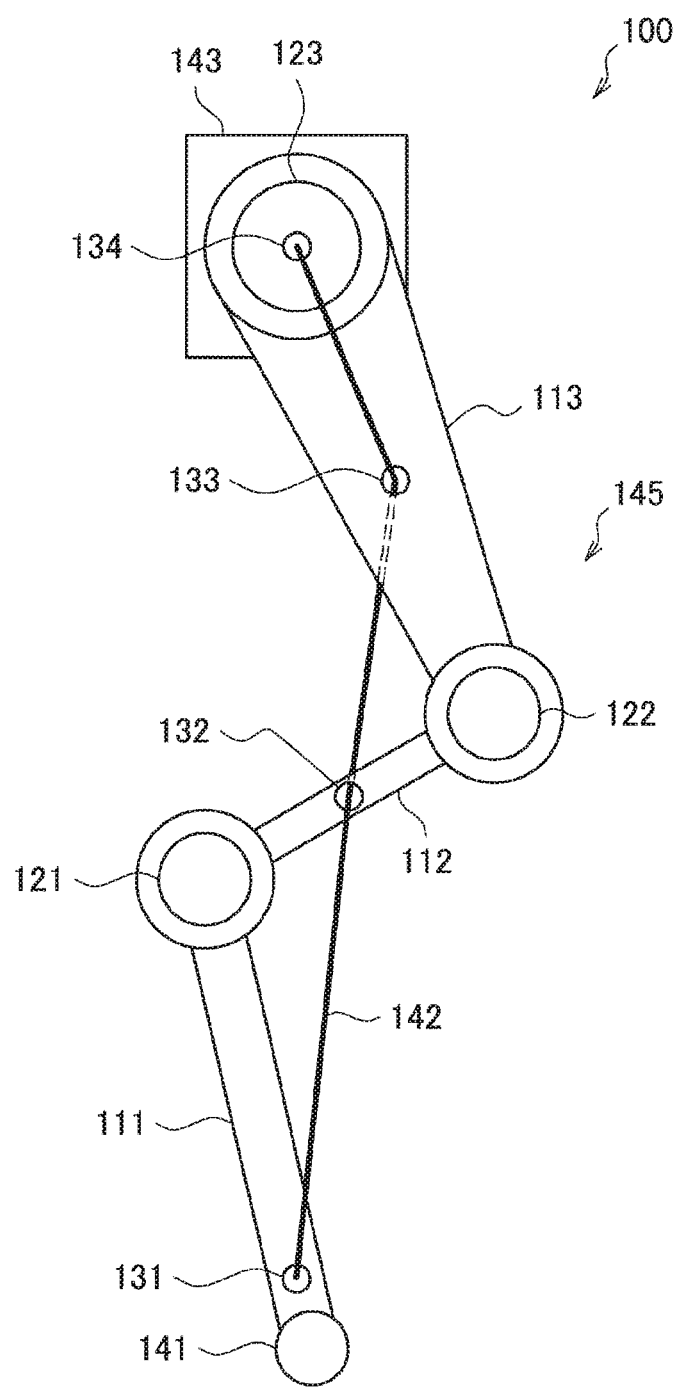
FIG. 1 is a schematic diagram illustrating an exemplary configuration of an expansion device according to a first embodiment of the present disclosure.

Hereinafter, preferred embodiments of the present disclosure will be described in detail with reference to the accompanying drawings. Note that, in the present specification and the drawings, components having substantially the same functional configuration are denoted with the same reference numeral so as to omit redundant description.

Note that the description will be made in the following order.

1. First embodiment
1.1. Exemplary configuration of expansion device
1.2. Specific example of expansion device
2. Second embodiment
2.1. Exemplary configuration of walking movable body
2.2. Modification of walking movable body
2.3. Specific example of walking movable body
3. Summary

1. First Embodiment (1.1. Exemplary Configuration of Expansion Device)

First, an exemplary configuration of an expansion device according to a first embodiment of the present disclosure will be described with reference to FIGS. 1 to 3. FIG. 1 is a schematic diagram illustrating an exemplary configuration of an expansion device 100 according to the present embodiment. The expansion device 100 according to the present embodiment can be used as, for example, a leg or an arm of a robot device. In the following description, it is assumed that the expansion device 100 be the leg of the robot device.

As illustrated in FIG. 1, the expansion device 100 includes a main body 143 and a limb portion 145 attached to the main body 143. The limb portion 145 includes a grounding portion 141, a first link 111, a first limb joint 121, a second link 112, a second limb joint 122, a third link 113, a main body joint 123, and a linear member 142.

The main body 143 is, for example, a portion for attaching the limb portion 145 to a main body of a robot device which is not illustrated or a robot device which is not illustrated. The main body 143 may include a driving motor and the like which generates an output for expand and contract the limb portion 145.

The limb portion 145 includes a plurality of links and at least one or more joints, and for example, is provided to be expanded and contracted by the output of the driving motor included in the main body 143 and the like. In FIG. 1, the limb portion 145 is illustrated which includes a link mechanism including three links and two joints. However, the technology according to the present disclosure is not limited to the example illustrated in FIG. 1. The technology according to the present disclosure can be applied to any limb portion as long as the limb portion includes two or more links and one or more joints.

Note that, in the following description, in the limb portion 145, a state where angles formed by the links coupled to the first limb joint 121 and the second limb joint 122 are the largest and the limb portion 145 is most expanded is referred to as an extended state. Furthermore, a state where the angles formed by the links coupled to the first limb joint 121 and the second limb joint 122 are the smallest and the limb portion 145 is most bended is referred to as a bending state.

The main body joint 123 rotatably couples the third link 113 to the main body 143. A direction of a rotation shaft of the main body joint 123 may be, for example, perpendicular to an extending direction of the limb portion 145. Specifically, the main body joint 123 includes a rotation shaft in a direction from a front side to a back side in FIG. 1, and the third link 113 may rotate in the plane of FIG. 1. Note that a rotatable range of the main body joint 123 is not particularly limited.

One end of the third link 113 is coupled to the main body 143 by the main body joint 123, and the other end of the third link 113 is coupled to the second link 112 by the second limb joint 122. Specifically, the third link 113 is provided with respect to the main body 143 to be rotatable around the rotation shaft of the main body joint 123 and is provided with respect to the second link 112 to be rotatable around the rotation shaft of the second limb joint 122. The third link 113 is a link provided at a position closest to the main body 143 in the limb portion 145 and is referred to as a main link in the present specification.

The second limb joint 122 rotatably couples the second link 112 to the third link 113. A direction of a rotation shaft of the second limb joint 122 may be, for example, perpendicular to the extending direction of the limb portion 145. Specifically, the second limb joint 122 includes, for example, a rotation shaft in a direction from the front side to the back side in FIG. 1, and the second link 112 may rotate in the plane of FIG. 1.

One end of the second link 112 is coupled to the third link 113 by the second limb joint 122, and the other end of the second link 112 is coupled to the first link 111 by the first limb joint 121. Specifically, the second link 112 is provided with respect to the third link 113 to be rotatable around the rotation shaft of the second limb joint 122 and is provided with respect to the first link 111 to be rotatable around the rotation shaft of the first limb joint 121. The second link 112 is a link which does not correspond to the main link described above and an end link as described later in the limb portion 145 and is referred to as an intermediate link in the present specification.

The first limb joint 121 rotatably couples the first link 111 to the second link 112. A direction of a rotation shaft of the first limb joint 121 may be, for example, perpendicular to the extending direction of the limb portion 145. Specifically, the first limb joint 121 includes, for example, a rotation shaft in the direction from the front side to the back side in FIG. 1, and the first link 111 may rotate in the plane of FIG. 1.

One end of the first link 111 is coupled to the second link 112 by the first limb joint 121, and the grounding portion 141 is provided at the other end of the first link 111. Specifically, the first link 111 is provided with respect to the second link 112 to be rotatable around the rotation shaft of the first limb joint 121 and supports the main body 143 against the ground and the like via the grounding portion 141. The first link 111 is a link provided at the most front end side of the limb portion 145 in the limb portion 145 and is referred to as the end link in the present specification.

Rotatable ranges of the first limb joint 121 and the second limb joint 122 include at least angular ranges corresponding to semicircles facing each other. With these ranges, the first limb joint 121 and the second limb joint 122 can respectively rotate in directions opposite to each other. Therefore, the limb portion 145 can be bent so as to be folded. On the other hand, in a case where the rotatable ranges of the first limb joint 121 and the second limb joint 122 are, for example, only angular ranges corresponding to semicircles facing the same direction, it is difficult to bend the limb portion 145 to be folded. Therefore, a volume of a rectangular parallelepiped required for housing the limb portion 145 in the bending state (referred to as housing volume below) becomes larger than the above. Note that, even in a case where the limb portion 145 includes three or more limb joints, similarly, it is preferable that rotatable ranges of the three or more limb joints include at least angular ranges corresponding to the semicircles facing each other.

As described above, the direction of the rotation shaft of each of the main body joint 123, the first limb joint 121, and the second limb joint 122 may be perpendicular to the extending direction of the limb portion 145. In such a case, the expansion device 100 can be used as a leg or an arm of a so-called vertical articulated robot.

The rotation shafts of the main body joint 123, the first limb joint 121, and the second limb joint 122 may be parallel to each other. For example, in a case where the rotation shafts of the main body joint 123 and the joints of the limb portion 145 (first limb joint 121 and second limb joint 122) are parallel to each other, the first link 111, the second link 112, and the third link 113 are folded in the same direction in the bending state. Therefore, the expansion device 100 is folded so that the housing volume is further reduced. On the other hand, in a case where the rotation shafts of the main body joint 123 and the joints of the limb portion 145 (first limb joint 121 and second limb joint 122) are skew lines to each other, the first link 111, the second link 112, and the third link 113 are folded in the different directions in the bending state. Therefore, the expansion device 100 is folded in a shape from which any one of the links protrudes. Therefore, in order to fold the limb portion 145 in a bending state having a smaller housing volume, it is preferable that the rotation shafts of the main body joint 123 and the joints of the limb portion 145 be parallel to each other.

In the limb portion 145, the grounding portion 141 is a portion having contact with the ground and the like. The grounding portion 141 may include, for example, a cover, an impact absorbing member, or the like to protect the limb portion 145 from the ground and the like and may include various sensors such as a pressure sensor which detects a grounding pressure of the limb portion 145. Note that, in a case where the expansion device 100 is the arm of the robot device, for example, a functional unit which performs a function of the robot device (for example, holding portion for holding object, working portion for performing work, or the like) may be provided instead of the grounding portion 141.

The linear member 142 couples the first link 111 provided at a front end side of the limb portion 145 (in other words, end link) and the main body 143 with both ends of the linear member 142, and the both ends are provided to be retractable to one or both of the first link 111 and the main body 143. The linear member 142 is, for example, a wire-like member having flexibility and low elasticity and, for example, may be a metal wire rod such as a piano wire, a synthetic fiber having high tensile strength such as an aramid fiber, or the like.

For example, one end of the linear member 142 may be coupled to a connection point 131 provided in the first link 111 existing at the end of the limb portion 145 on the side of the grounding portion 141. The linear member 142 passes through a guide 132 provided on the second link 112 and a guide 133 provided on the third link 113, and the other end of the linear member 142 may be retracted to the main body 143 at a connection point 134. In such a case, the main body 143 may include, for example, a retraction mechanism for retracting the linear member 142 such as a winch.

Alternatively, one end of the linear member 142 may be provided to be retracted to the first link 111 existing at the end of the limb portion 145 on the side of the grounding portion 141. The linear member 142 passes through the guide 132 provided on the second link 112 and the guide 133 provided on the third link 113, and the other end of the linear member 142 may be coupled to the main body 143 at a connection point 134. In such a case, the first link 111 may include, for example, a retraction mechanism for retracting the linear member 142 such as a winch. By providing a mass body such as a retraction mechanism at the front end side of the limb portion 145, the center of gravity of the walking movable body using the expansion device 100 as the leg can be more lowered. Therefore, the walking movable body can be more stable.

For example, when the linear member 142 is retracted to the main body 143 or the first link 111, the linear member 142 may be coupled to the first link 111 or the main body 143 with strength sufficient for moving the first link 111 and the main body 143 closer to each other. With this structure, in the expansion device 100, by retracting the linear member 142 to the main body 143 or the first link 111, the first link 111 and the main body 143 can move closer to each other, and the state of the limb portion 145 can be shifted to the bending state. On the other hand, the guide 132 of the second link 112 and the guide 133 of the third link 113 do not need to be respectively coupled with the second link 112 and the third link 113, and it is sufficient that, for example, the linear member 142 pass through through-holes provided in the second link 112 and the third link 113. This is because the guide 132 on the second link 112 and the guide 133 on the third link 113 function as guides for smoothly guiding the linear member 142 to the main body 143.

Here, the bending state of the expansion device 100 will be described with reference to FIG. 2. FIG. 2 is a schematic diagram illustrating the bending state of the expansion device 100 illustrated in FIG. 1.

In the expansion device 100 according to the present embodiment, the linear member 142 is retracted to the main body 143 or the main body 143 so that the first link 111 and the main body 143 coupled by the linear member 142 move closer to each other. With this structure, the second link 112 rotates around the rotation shaft of the first limb joint 121 so that an angle formed by the second link 112 and the first link 111 becomes smaller and further rotates around the rotation shaft of the second limb joint 122 so that an angle formed by the second link 112 and the third link 113 becomes smaller. Therefore, the angle formed by the first link 111 and the second link 112 coupled to the first limb joint 121 and the angle formed by the second link 112 and the third link 113 coupled to the second limb joint 122 become smaller, and the state of the limb portion 145 is shifted to the bending state.

Figure 2:
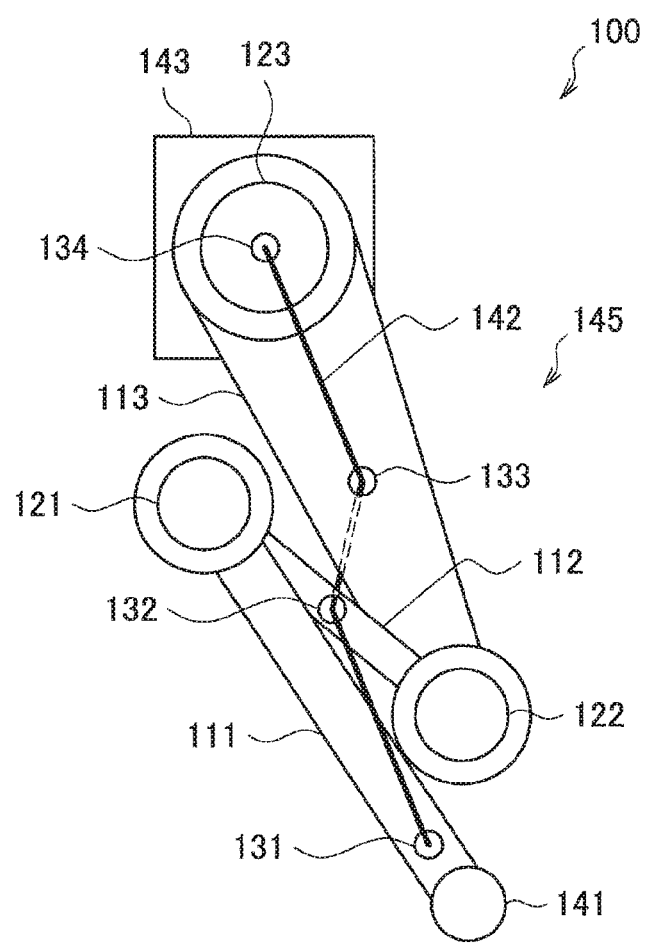
FIG. 2 is a schematic diagram illustrating a bending state of the expansion device illustrated in FIG. 1.

As illustrated in FIG. 2, the bending state of the expansion device 100 has, for example, a shape in which the first link 111, the second link 112, and the third link 113 are alternately overlapped with the first limb joint 121 and the second limb joint 122 as bending points (in other words, shape folded in zigzag). However, the bending state of the expansion device 100 is not limited to the shape illustrated in FIG. 2. The shape of the bending state of the expansion device 100 may be other shape as long as the housing volume of the limb portion 145 is smaller than that in the extended state.

Since the expansion device 100 in such a bending state has a compact shape with fewer protruding portions and a small housing volume, the expansion device 100 is more conveniently housed or transported, for example. Furthermore, in the expansion device 100 in the bending state, the number of projections of the limb portion 145 from the main body 143 is smaller than that in the extended state. Therefore, the expansion device 100 is less likely to be damaged by an external force, for example.

Note that, the connection point 131 and the guides 132 and 133 for coupling the linear member 142 and the limb portion 145 may be respectively provided on the first link 111, the second link 112, and the third link 113 so that a magnitude of a moment of a force applied to the first link 111, the second link 112, and the third link 113 is further increased when the linear member 142 is retracted to the main body 143 or the first link 111. With this structure, when the linear member 142 is retracted to the main body 143, the limb portion 145 can be folded to be in the bending state with a smaller force.

For example, the connection point 131 and the guides 132 and 133 for coupling the linear member 142 and the limb portion 145 may be provided so that a direction of the force applied to each of the connection point 131 and the guides 132 and 133 when the first link 111, the second link 112, and the third link 113 are rotated substantially coincides with a direction of a tangent of a locus on which each of the connection point 131 and the guides 132 and 133 moves.

Specifically, in a case where the connection point 131 of the first link 111 is provided at the front end side of the limb portion 145 of the first link 111, the guide 132 of the second link 112 may be provided at an intersection between a tangent of a virtual circle including an arc drawn by the connection point 131 when the first link 111 is rotated and the second link 112. Similarly, the guide 133 of the third link 113 may be provided at an intersection between a tangent of a virtual circle including an arc drawn by the guide 132 when the second link 112 is rotated and the third link 113. In this way, the position of the connection point or the guide provided on each link can be determined. Note that, in a case where the intersection between the tangent of the virtual circle including the arc drawn by the connection point or the guide and each link does not exist on each link, it is sufficient if the connection point or the guide be provided at a position closer to the intersection on each link.

Furthermore, the connection point 131 and the guides 132 and 133 for coupling the linear member 142 and the limb portion 145 may be respectively provided on the first link 111, the second link 112, and the third link 113 so that a distance from the rotation shaft of each of the first limb joint 121, the second limb joint 122, and the main body joint 123 increases.

Specifically, the connection point 131 of the first link 111 may be provided on an end side opposite to an end of the first link 111 connected to the first limb joint 121 (in other words, front end of limb portion 145). The guide 132 of the second link 112 may be provided at a midpoint position of the second link 112 separated from the first limb joint 121 and the second limb joint 122. Similarly, the guide 133 of the third link 113 may be provided at a midpoint position of the third link 113 separated from the second limb joint 122 and the main body joint 123.

Moreover, as a modification, each of the connection points or the guides for coupling the linear member 142 with the limb portion 145 can be provided on the first link 111, the second link 112, and the third link 113 so that the linear member 142 does not interfere with the movement of the limb portion 145. Such a modification will be described with reference to FIG. 3. FIG. 3 is a schematic diagram illustrating a modification of an attachment position of the linear member 142 to the expansion device 100 illustrated in FIG. 2

Figure 3:
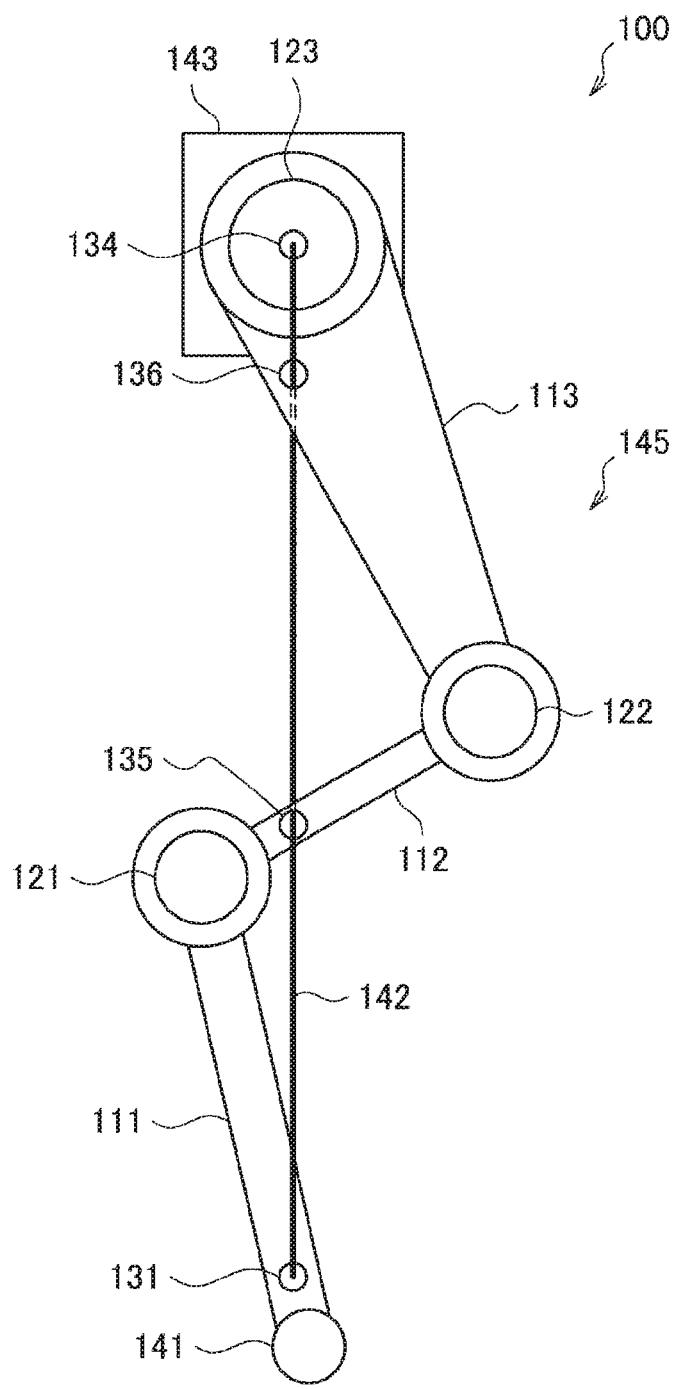
FIG. 3 is a schematic diagram illustrating a modification of a linear member attachment position to the expansion device illustrated in FIG. 2.

For example, as illustrated in FIG. 3, guides 135 and 136 can be respectively provided on the second link 112 and the third link 113 so that the connection points 131 and 134 and the guides 135 and 136 are aligned on the expansion device 100 in the extended state.

Specifically, the connection point 131 of the first link 111 is provided at an end of the first link 111 on the front end side of the limb portion 145, and the connection point 134 is provided at the center and the like of the main body joint 123 where the main body 143 and the third link 113 overlap with each other. At this time, the guide 135 on the second link 112 and the guide 136 on the third link 113 may be respectively provided at intersections between the line connecting the connection points 131 and 134 and the second link 112 and the third link 113. With this structure, since the shorter linear member 142 can be attached to the limb portion 145 in a state where the linear member 142 has less looseness, it is possible to reduce a possibility that the linear member 142 interfere with the movement of the limb portion 145.

(1.2. Specific Example of Expansion Device)

Figure 4:
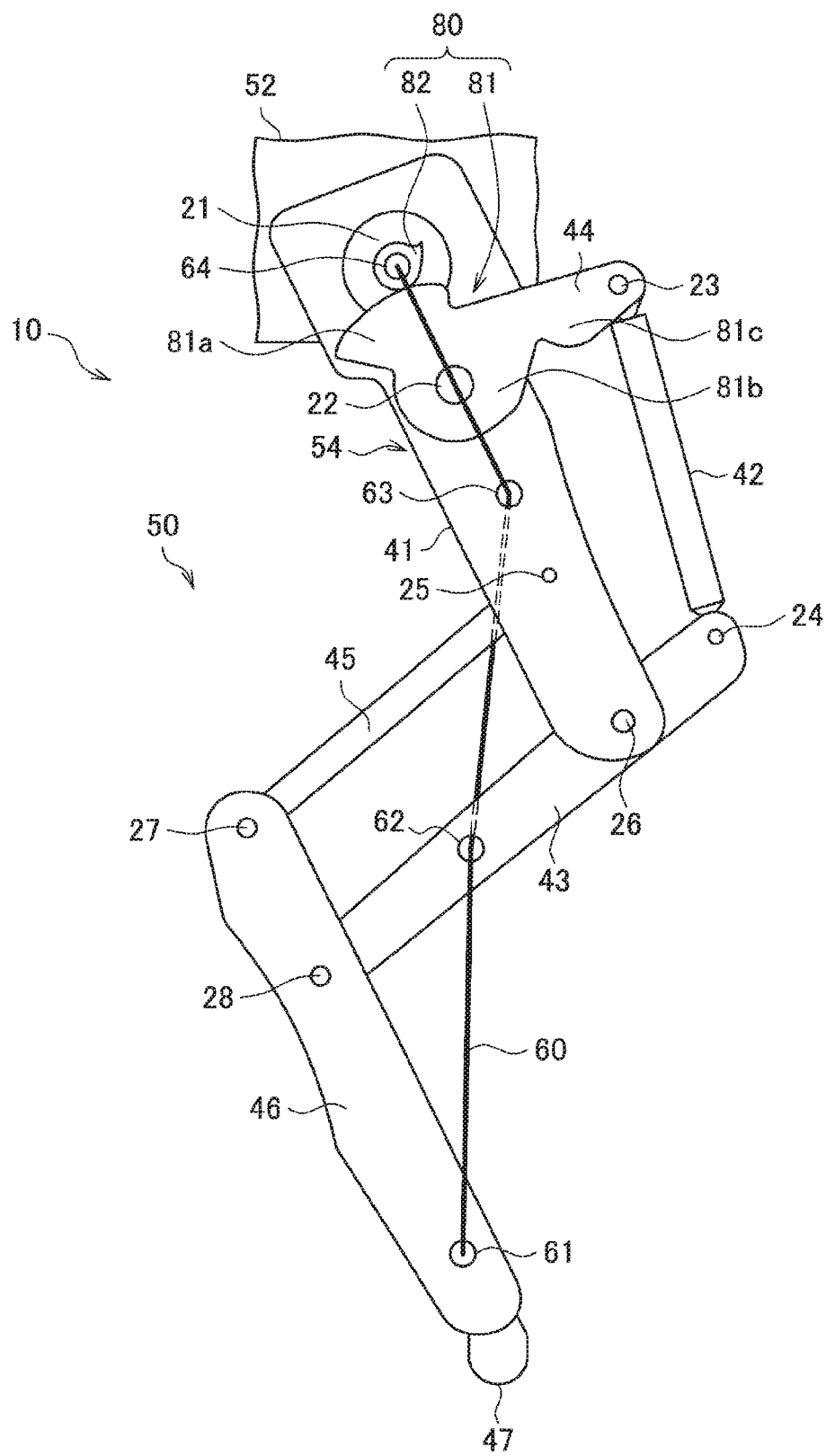
FIG. 4 is a schematic diagram illustrating an expansion device according to a specific example of the first embodiment.
Figure 5:
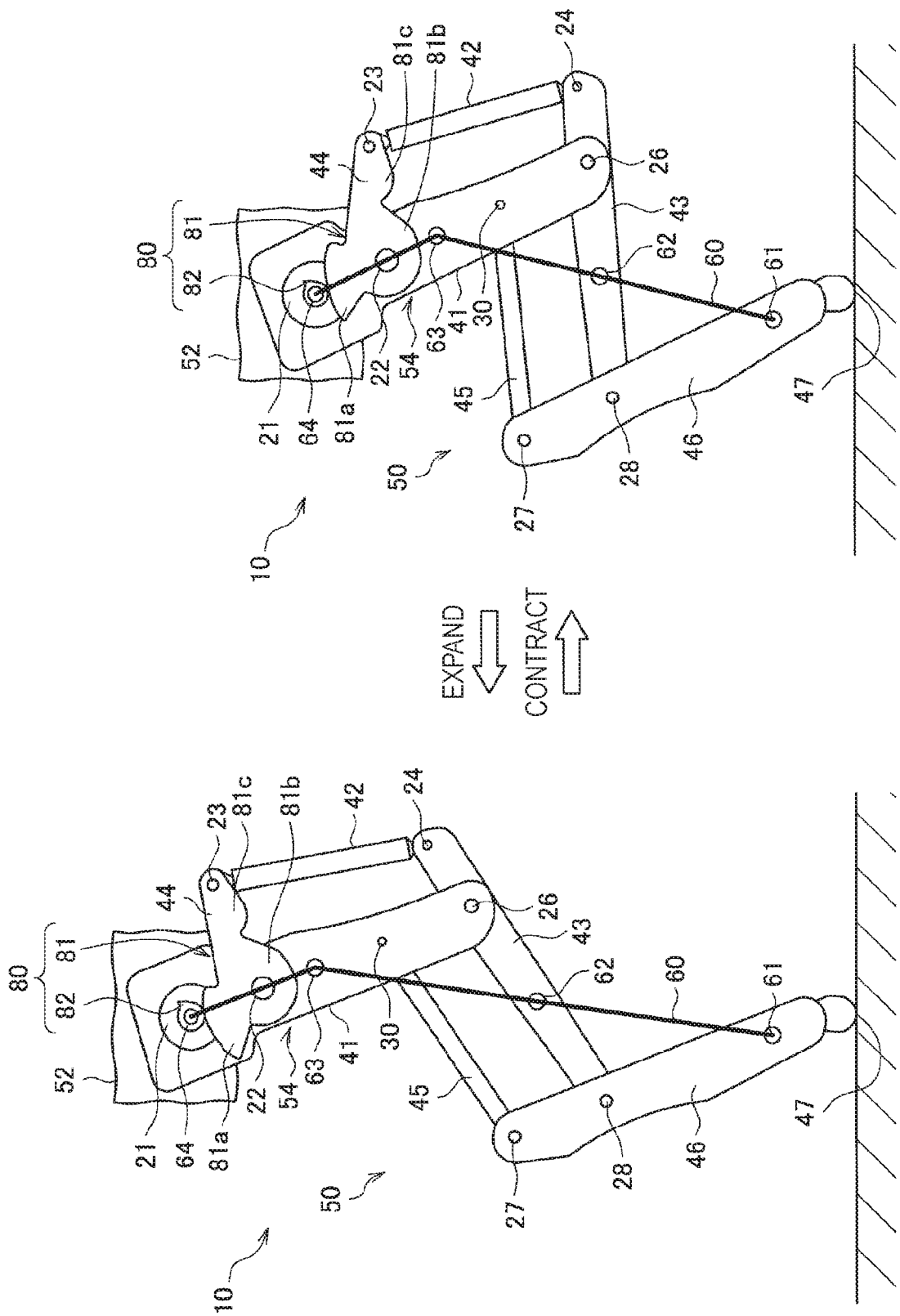
FIG. 5 is a schematic diagram for explaining a state of expansion and contraction by the expansion device illustrated in FIG. 4.
Figure 6:
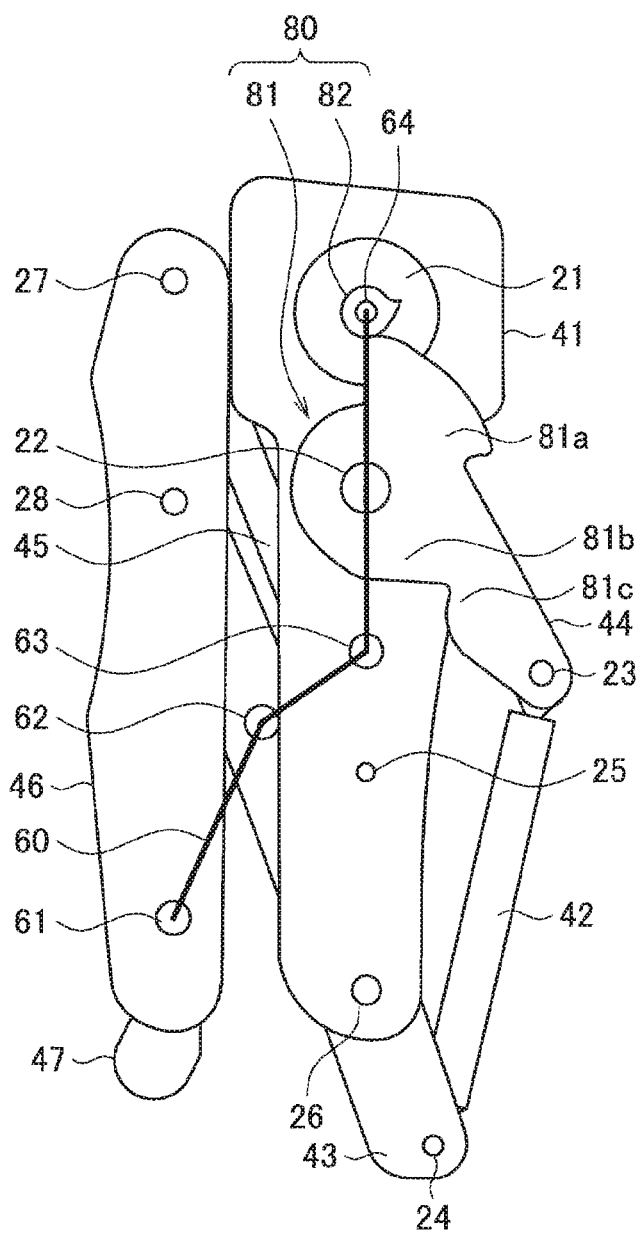
FIG. 6 is a schematic diagram illustrating a bending state of the expansion device illustrated in FIG. 4.

Next, a specific example of the expansion device according to the present embodiment will be described with reference to FIGS. 4 to 6. FIG. 4 is a schematic diagram illustrating an expansion device 10 according to the specific example of the present embodiment. FIG. 5 is a schematic diagram for explaining a state of expansion and contraction by the expansion device 10 illustrated in FIG. 4. FIG. 6 is a schematic diagram illustrating a bending state of the expansion device 10 illustrated in FIG. 4.

As illustrated in FIG. 4, the expansion device 10 according to the specific example includes a main body 52 and a limb portion 50 attached to the main body 52 via a main body joint which is not illustrated, and the limb portion 50 includes a link mechanism 54, a motor 21, a pair of non-circular gears 80, and a linear member 60. The link mechanism 54 is configured to be expanded and contracted according to power output from the motor 21.

In the expansion device 10, the power output from the motor 21 is output to the link mechanism 54 via the pair of non-circular gears 80. The pair of non-circular gears 80 is a pair of rotation bodies and outputs the power output from the motor 21 to the link mechanism 54 at a reduction ratio according to a posture of the link mechanism 54. Specifically, the pair of non-circular gears 80 includes an input-side gear 82 and an output-side gear 81 and functions as a transmission mechanism which decelerates and outputs the power input from the motor 21. Furthermore, in a region where the input-side gear 82 has contact with the output-side gear 81, a plurality of teeth engaged with each other is provided, and the output-side gear 81 rotates in response to the rotation of the input-side gear 82. For example, a rotation angle of the output-side gear 81 has a nonlinearity with respect to a rotation angle of the input-side gear 82 so that the pair of non-circular gears 80 changes the reduction ratio according to the posture of the link mechanism 54. A rotation shaft of the input-side gear 82 and a rotation shaft of the motor 21 may be directly connected to each other or may be coupled to each other via one or more circular gears. Note that the pair of non-circular gears 80 is simply referred to as non-circular gears 80.

The link mechanism 54 includes a plurality of links. Specifically, the link mechanism 54 includes a link 41, a link 44 which is a part of the output-side gear 81, a link 42, a link 43, a link 45, and a link 46. In the expansion device 10 illustrated in FIG. 4, the link 41 corresponds to the main link described above, and the link 46 corresponds to the end link described above.

At least a part of the link mechanism 54 forms a trapezoidal link mechanism. For example, the link 41, the link 42, the link 43, and the link 44 form a trapezoidal link mechanism which is a four-bar link mechanism in which the lengths of the links facing each other are different from each other.

The link 41 includes the pair of non-circular gears 80 and the motor 21. Specifically, the input-side gear 82 and the motor 21 are provided on one end side of the link 41, and the output-side gear 81 is provided closer to the center than the input-side gear 82 in the extending direction of the link 41. The input-side gear 82 and the output-side gear 81 are connected to the link 41 via the respective rotation shafts and are rotatably provided with respect to the link 41. However, the positions of the rotation shaft of the input-side gear 82 and the rotation shaft of the output-side gear 81 are relatively fixed to the link 41. The motor 21 is provided to be fixed to the link 41.

One end side of the link 41 is rotatably coupled to the main body 52. Specifically, the one end of the link 41 is provided with respect to the main body 52 to be rotatable around the input-side gear 82, and the other end of the link 41 is provided to the center of the link 43 and the one end of the link 45 to be respectively rotatable around a shaft portion 26 and a shaft portion 25 as the rotation shafts. Note that the shaft portion 25 is provided at a position closer to the center than the shaft portion 26 in the extending direction of the link 41.

The link 44 is configured by a part of the output-side gear 81 and is provided to be rotated by the power input from the motor 21. The output-side gear 81 includes, for example, a teeth portion 81a engaged with a teeth portion of the input-side gear 82, an attachment portion 81b coupled to the link 41 via a shaft portion 22, and a projection portion 81c projecting to a radial direction of the shaft portion 22. The projection portion 81c is provided at a position different from the teeth portion 81a provided in the circumferential direction of the output-side gear 81, and a front end side of the projection portion 81c is connected to one end side of the link 44 via a shaft portion 23. In other words, the link 44 includes the attachment portion 81b and the projection portion 81c. Such a link 44 can be rotated integrally with the output-side gear 81 and can rotate around the shaft portion 23 as the rotation shaft with respect to the link 42. However, the link 44 may include a plurality of members and does not need to include a part of the output-side gear 81.

The link 42 is arranged so as to face the link 41. One end side of the link 42 is connected to the other end side of the link 44 via the shaft portion 23, and the link 42 is rotatably provided with respect to the link 44 around the shaft portion 23 as the rotation shaft. The other end side of the link 42 is connected to one end side of the link 43 via a shaft portion 24, and the link 42 is rotatably provided with respect to the link 43 around the shaft portion 24 as the rotation shaft.

The link 43 is arranged so as to face the link 44 and is provided to be rotatable in response to the rotation of the link 44. One end side of the link 43 is connected to the other end side of the link 42 via the shaft portion 24, and the link 43 is rotatably provided with respect to the link 42 around the shaft portion 24 as the rotation shaft. The other end side of the link 43 is connected to the center of the link 46 via a shaft portion 28, and the link 46 is rotatably provided with respect to the link 46 around the shaft portion 28 as the rotation shaft.

In other words, the link 41 and the link 42 are connected to the link 44 and the link 43 so as to rotate the link 44 and the link 43.

One end side of the link 45 is connected to the center of the link 41 via the shaft portion 25, and the link 45 is rotatably provided with respect to the link 41 around the shaft portion 25 as the rotation shaft. The other end side of the link 45 is connected to one end side of the link 46 via a shaft portion 27, and the link 45 is rotatably provided with respect to the link 46 around the shaft portion 27 as the rotation shaft.

One end side of the link 46 is rotatably provided to the other end side of the link 45 and the other end side of the link 43 respectively via the shaft portion 27 and the shaft portion 28. Note that the shaft portion 28 is provided at a position closer to the center than the shaft portion 27 in the extending direction of the link 46. At the other end side of the link 46, a grounding portion 47 is provided, and the grounding portion 47 has contact with the ground and the like.

In the expansion device 10, the link 41, the link 43, the link 45, and the link 46 form a parallel link mechanism. In the parallel link mechanism, the lengths of the link 41 and the link 46 facing each other substantially coincide with each other, and the lengths of the link 43 and the link 45 facing each other substantially coincide with each other. Specifically, a distance between the shaft portion 25 and the shaft portion 26 substantially coincides with a distance between the shaft portion 27 and the shaft portion 28, and a distance between the shaft portion 25 and the shaft portion 27 substantially coincides with a distance between the shaft portion 26 and the shaft portion 28.

One end of the linear member 60 is coupled to the link 46, and the other end is provided to be retracted to the main body 52. Specifically, one end of the linear member 60 is coupled to a connection point 61 on the other end side of the link 46, and the other end of the linear member 60 passes through a guide 62 provided at the center of the link 43 and a guide 63 provided at the center of the link 41 and is retracted to the main body 52. The other end of the linear member 60 is, for example, retracted from a connection point 64 provided on the motor 21 to the main body 52.

In the expansion device 10, in a case where a torque output from the motor 21 is transmitted to the link mechanism 54, as illustrated in FIG. 5, the link mechanism 54 expands and contracts to generate a reaction force to the ground in the expansion device 10. Specifically, a reaction force having a magnitude equal to a mass of a target to be supported by the expansion device 10 acts on the grounding portion 47 on the other end side of the link 46. Therefore, the expansion device 10 can function as, for example, a leg for supporting a mass of a robot device.

Note that, in the posture of the link mechanism 54, moments to be applied to the respective links are balanced. In the expansion device 10, a distance between the shaft portion 22 and the shaft portion 26 of the link 41, a distance between the shaft portion 26 and the shaft portion 28 of the link 43, and a distance between the shaft portion 28 and the grounding portion 47 of the link 46 may be equal to each other. For example, the link mechanism 54 may be configured so as to expand and contract so that the shaft portion 22 is positioned above the grounding portion 47 in the vertical direction.

Here, in a case where the linear member 60 is retracted to the main body 52, as illustrated in FIG. 6, the state of the expansion device 10 is shifted to the bending state where the link 41 has contact with the link 46 by deforming the parallel link mechanism included in the link mechanism 54. Specifically, by retracting the linear member 60 to the main body 52, the parallel link mechanism is deformed so that the link 41 and the link 46 which face each other move closer to each other, and the state of the expansion device 10 is shifted to the bending state. At this time, since the pair of non-circular gears 80 rotates according to the rotation of each link, the motor 21 connected to the input-side gear 82 idles. Since such an expansion device 10 in the bending state may have a compact shape having fewer protruding portions, there are advantageous for housing and transporting the expansion device 10, for example, and the expansion device 10 is less likely to be damaged due to a drop and the like.

Note that FIGS. 4 to 6 illustrate the specific example of the expansion device according to the present embodiment, and the expansion device according to the present embodiment is not limited to the example illustrated in FIGS. 4 to 6.

2. Second Embodiment (2.1. Exemplary Configuration of Walking Movable Body)

Figure 7:
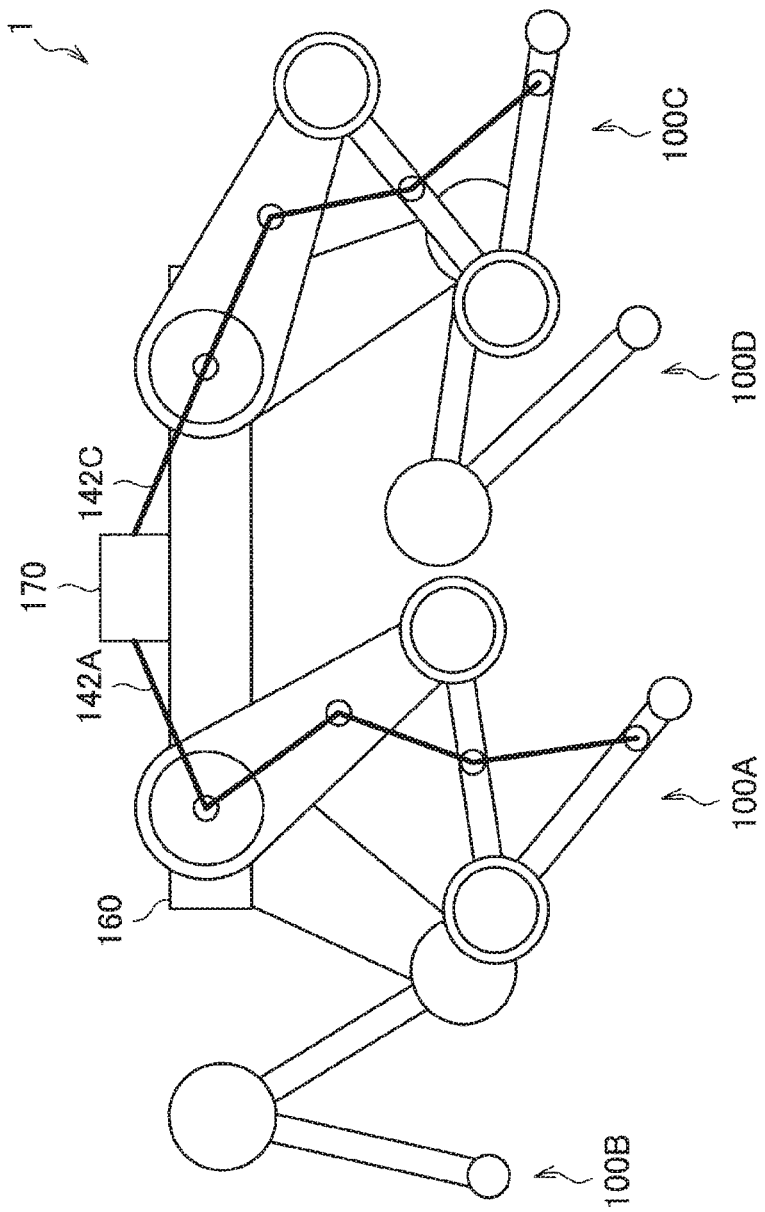
FIG. 7 is a schematic diagram illustrating an exemplary configuration of a walking movable body according to a second embodiment of the present disclosure.

Subsequently, a walking movable body which is an example of a movable body according to a second embodiment of the present disclosure will be described with reference to FIGS. 7 and 8. FIG. 7 is a schematic diagram illustrating an exemplary configuration of a walking movable body 1 according to the present embodiment. The walking movable body 1 according to the present embodiment is, for example, a walking robot device using the expansion device 100 according to the first embodiment for at least one or more legs.

As illustrated in FIG. 7, the walking movable body 1 includes a movable body main body 160, legs 100A, 100B, 100C, and 100D (collectively referred to as leg 101), and a limb control unit 170. For example, the walking movable body 1 may be a four-legged walking robot device.

The movable body main body 160 includes, for example, a control device which controls movement of each leg 101 of the walking movable body 1, a driving motor which drives each leg 101 of the walking movable body 1, and the like. The movable body main body 160 may further include various sensors which measure various information regarding surrounding environment in order to control the movement of the walking movable body 1. Note that, in a case where the walking movable body 1 is used to transport goods, a good's storage and the like for mounting the goods may be provided in the movable body main body 160.

At least one or more legs 101 may be configured by the expansion device 100 described in the first embodiment. For example, all the legs 101 may be configured by the expansion devices 100 described in the first embodiment. Since details of the configuration of the leg 101 are as described in the first embodiment, the description is omitted here.

Note that it is preferable that at least one or more directions of rotation shafts of joints of the respective legs 101 be a roll direction or a pitch direction of the walking movable body 1. In such a case, the expansion device illustrated in FIG. 1 and the like enables the walking movable body 1 to walk by the leg 101 and can function as the leg 101 of the walking movable body 1. For example, as illustrated in FIG. 7, each direction of the rotation shaft of the joint of the leg 101 of the walking movable body 1 may be the pitch direction of the walking movable body 1.

Each leg 101 includes linear members 142A, 142B (not illustrated), 142C, and 142D (not illustrated). These linear members 142A, 142B, 142C, and 142D are collectively referred to as linear members 142. Both ends of the linear member 142 couple an end link of each leg 101 to the movable body main body 160, and the linear member 142 is provided so as to be retracted to both or one of the end link and the movable body main body 160. For example, each linear member 142 is retracted to the movable body main body 160 under the control by the limb control unit 170 so that the state of each leg 101 is shifted to the bending state. Note that it is needless to say that the state of each leg 101 may be shifted to the bending state by retracting each linear member 142 to the end link of each leg 101 according to an instruction from the limb control unit 170.

By controlling the retraction of each linear member 142 to the movable body main body 160 or the end link of the leg 101, the limb control unit 170 controls the shift of the state of each leg 101 to the bending state. For example, in a case where the walking movable body 1 is about to fall, the limb control unit 170 may shift the state of each leg 101 to the bending state by retracting each linear member 142 to the movable body main body 160. Furthermore, by retracting each linear member 142 to the movable body main body 160 when the walking movable body 1 is housed or transported (here, transportation indicates that user holds and carries walking movable body 1 by hands), the limb control unit 170 may shift the state of each leg 101 to the bending state where the housing volume is small.

Here, an internal configuration of the limb control unit 170 will be specifically described with reference to FIG. 8. FIG. 8 is a block diagram illustrating the internal configuration of the limb control unit 170.

Figure 8:
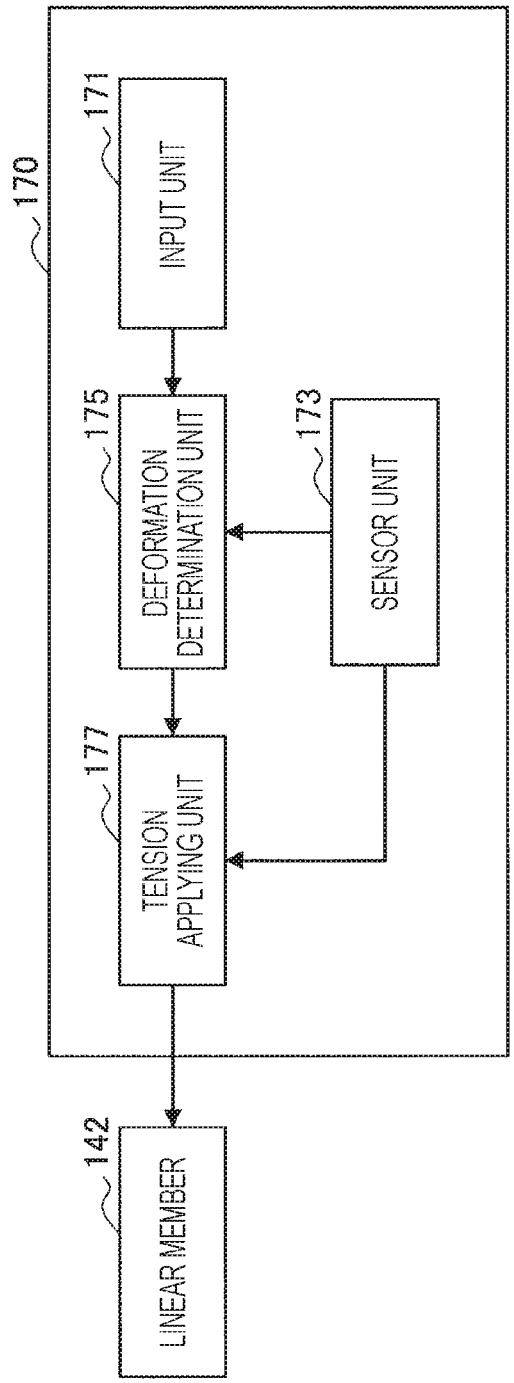
FIG. 8 is a block diagram illustrating an internal configuration of a limb control unit according to the second embodiment.

As illustrated in FIG. 8, the limb control unit 170 includes an input unit 171, a sensor unit 173, a deformation determination unit 175, and a tension applying unit 177.

The input unit 171 includes an input device which receives an input from a user such as a button, a switch, and a lever, for example, and an input control circuit which generates an input signal on the basis of the input information. For example, the input unit 171 outputs a signal instructing the shift of the state of each leg 101 to the bending state to the limb control unit 170 on the basis of the input from the user. With this operation, for example, in a case where the user houses or transports the walking movable body 1, the walking movable body 1 can be more easily operated by operating the input unit 171 so as to shift the state of each leg 101 to the bending state.

The sensor unit 173 includes a sensor which measures various information used to detect fall of the walking movable body 1. For example, the sensor unit 173 may include a surface pressure sensor or a surface sensor which detects an external force or impact applied to the walking movable body 1, a geomagnetic sensor which detects the posture and the movement of the walking movable body 1, an Inertial Measurement Unit (IMU) including a gyro sensor, an acceleration sensor, and the like, an ammeter which detects an inverse current generated in the driving motor for driving each leg 101 to which the external force is applied, an imaging device which captures an image corresponding to vision of the walking movable body 1, and the like. The various information measured by the sensor unit 173 is output to the deformation determination unit 175 and used for determination by the deformation determination unit 175.

The deformation determination unit 175 determines whether or not to retract each linear member 142 to the movable body main body 160. In other words, the deformation determination unit 175 determines whether or not to shift the state of each leg 101 to the bending state.

For example, the deformation determination unit 175 determines whether or not the walking movable body 1 falls on the basis of the information measured by the sensor unit 173 and may determine whether or not to shift the state of each leg 101 to the bending state on the basis of the determination result.

Specifically, in a case where an external force or a moment applied to the walking movable body 1 is equal to or more than a threshold, the deformation determination unit 175 may determine to shift the state of each leg 101 to the bending state because there is a possibility that the walking movable body 1 falls. The deformation determination unit 175 determines a position of the center of gravity of the walking movable body 1 from the posture of the walking movable body 1 and the like. In a case where the determined position of the center of gravity is different from a predetermined position by equal to or more than a threshold, the deformation determination unit 175 may determine to shift the state of each leg 101 to the bending state because there is a possibility that the walking movable body 1 falls. The deformation determination unit 175 determines the posture of the walking movable body 1 from an image captured by an imaging device attached to the walking movable body 1. In a case where the walking movable body 1 is likely to fall, the deformation determination unit 175 may determine to shift the state of each leg 101 to the bending state. Moreover, in a case where the information measured by the sensor unit 173 is an abnormal value exceeding a normal range, the deformation determination unit 175 may determine to shift the state of each leg 101 to the bending state because there is a possibility that the walking movable body 1 falls.

According to such a deformation determination unit 175, in a case where the walking movable body 1 is likely to fall, the state of each leg 101 can be shifted to the bending state. The leg 101 in the bending state has fewer protruding portions than the leg 101 in the extended state. Therefore, regarding the walking movable body 1, by shifting the state of the leg 101 to the bending state and reducing the moment to be applied to the leg 101 when the walking movable body 1 falls, the damage or failure of the leg 101 caused by the fall can be reduced.

Furthermore, in a case where the instruction for shifting the state of each leg 101 to the bending state is input via the input unit 171, the deformation determination unit 175 may determine to shift the state of each leg 101 to the bending state. With this operation, in a case where the user houses or transports the walking movable body 1, the walking movable body 1 can be deformed into a shape which can be easily hold or handled.

The deformation determination unit 175 determines whether or not to shift at least one or more legs 101 to the bending state. Therefore, the deformation determination unit 175 may make determination for each leg 101. However, in order to suppress the occurrence of the damage or failure caused by the fall of the walking movable body 1, it is preferable that the deformation determination unit 175 make same determination on all the legs 101 and simultaneously retract the linear members 142 to the movable body main body 160.

For example, the deformation determination unit 175 can be formed by causing hardware including an arithmetic processing device such as a MPU and a storage device such as a memory and a program for making the above determination to cooperate with each other.

The tension applying unit 177 is a mechanism which can apply tension to each linear member 142. For example, the tension applying unit 177 may be various springs such as a coil spring and a plate spring or various actuators.

In a case where the tension applying unit 177 is various actuators, it is preferable that the tension applying unit 177 be an actuator different from the driving motor which expands and contracts each of the legs 101. This is because, in a case where the user houses or transports the walking movable body 1, there is a case where power for driving the walking movable body 1 is not turned on for the purpose of preventing an unintended operation of the walking movable body 1 or the purpose of reducing power consumption. Therefore, it is preferable that the tension applying unit 177 be formed by a power source different from the driving motor which expands and contracts each of the legs 101. Furthermore, it is more preferable that the tension applying unit 177 applies tension to the linear member 142 by a mechanism which does not need power such as a spring.

For example, in a case where the tension applying unit 177 is various actuators, by applying tension to each linear member 142 on the basis of the determination by the deformation determination unit 175, the tension applying unit 177 can shift the state of each leg 101 to the bending state. Specifically, in a case where the deformation determination unit 175 determines that there is a high possibility that the walking movable body 1 falls, the tension applying unit 177 may energize various actuators to generate tension and apply the tension to each linear member 142. In a case where the tension applying unit 177 is various actuators, the tension applying unit 177 can control a degree of the bending state of each leg 101, a magnitude of the tension to be applied to the linear member 142 when the leg 101 is bent in detail, and the like. For example, the tension applying unit 177 can control the state of each leg 101 to be in an intermediate state between the bending state and the extended state.

For example, in a case where the tension applying unit 177 is various springs, the tension applying unit 177 may constantly apply tension to each linear member 142. At this time, each leg 101 expands and contracts by the output from the driving motor against the tension from the tension applying unit 177 (so-called normally off operation). In such a case, in order to shift the state of the leg 101 to the bending state, it is sufficient if the output from the driving motor which makes each leg 101 expand and contract be turned off and only the tension from the tension applying unit 177 be applied to each linear member 142. In a case where the tension applying unit 177 is various springs, even when the power of the walking movable body 1 is not turned on, the state of each leg 101 can be shifted to the bending state. Therefore, the walking movable body 1 can be more conveniently housed or transported. Furthermore, even in a case where the power of the walking movable body 1 is suddenly turned off due to a failure and the like and the control of each leg 101 does not work, the tension applying unit 177 can shift the state of each leg 101 to the bending state which is less likely to be damaged due to the fall.

Moreover, the tension applying unit 177 may be a spring having a locking structure in which a spring which is extended to a certain extent can be fixed by hooking the spring to a projection, a notch, or the like. The spring having such a structure may be applied to, for example, a spiral spring formed by spirally winding a plate spring. In a case where the external force or impact is applied to the walking movable body 1, the tension applying unit 177 using the spring having such a structure can automatically generate the tension to the linear member 142 by unhooking the spring to the projection, the notch, or the like by the impact. Therefore, in a case where the spring having such a structure is used for the tension applying unit 177, the limb control unit 170 can omit the sensor unit 173 and the deformation determination unit 175.

According to the limb control unit 170 described above, it is possible to deform the walking movable body 1 into a shape which is less likely to be damaged or broken in a case where the walking movable body 1 falls. Furthermore, in a case where the walking movable body 1 is housed, transported, for example, it is possible to deform the walking movable body 1 into a compact shape which has a smaller housing volume and is more suitable for housing or transporting the walking movable body 1.

(2.2. Modification of Walking Movable Body)

Figure 9:
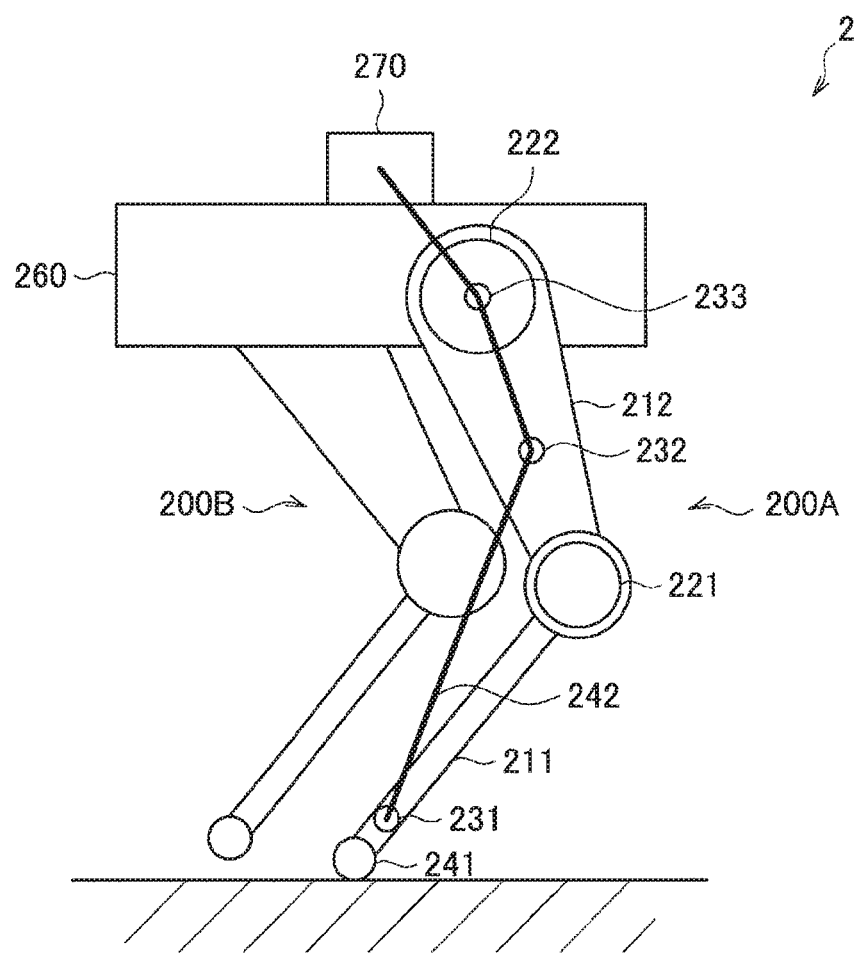
FIG. 9 is a schematic diagram illustrating an exemplary configuration of a walking movable body according to a modification of the second embodiment.

Next, a modification of the walking movable body according to the present embodiment will be described with reference to FIG. 9. FIG. 9 is a schematic diagram illustrating an exemplary configuration of a walking movable body 2 according to the modification.

As illustrated in FIG. 9, the walking movable body 2 includes a movable body main body 260, legs 200A and 200B, and a limb control unit 270. The walking movable body 2 may be, for example, a two-legged walking robot device including the two legs 200A and 200B. Note that each component illustrated in FIG. 9 is substantially similar to each component having the same name illustrated in FIGS. 1 and 7. Therefore, the description is omitted here.

In other words, the walking movable body according to the present embodiment may be the four-legged walking robot device illustrated in FIG. 7 and may be a two-legged walking robot device illustrated in FIG. 9. Moreover, the walking movable body according to the present embodiment may be a multi-legged walking robot device including more than four legs. Therefore, it is sufficient if the walking movable body according to the present embodiment include at least two or more legs that can be expanded and contracted.

As illustrated in FIG. 9, each of the legs 200A and 200B includes a grounding portion 241, a first link 211, a first limb joint 221, a second link 212, and a linear member 242 and is rotatably provided to the movable body main body 260 via a main body joint 222. The linear member 242 passes through guides 232 and 233 and couples a connection point 231 of the first link 211 and the movable body main body 260 and is provided to be retracted to both or one of the first link 211 and the movable body main body 260.

In other words, it is sufficient if the legs 200A and 200B of the walking movable body 2 according to the present embodiment can expand and contract between the movable body main body 260 supported by the legs 200A and 200B and the ground having contact with the legs 200A and 200B and can be bent by applying the tension to the linear member 242. Therefore, the number of links and joints of the leg included in the walking movable body according to the present embodiment are not particularly limited.

(2.3. Specific Example of Walking Movable Body)

Figure 10:
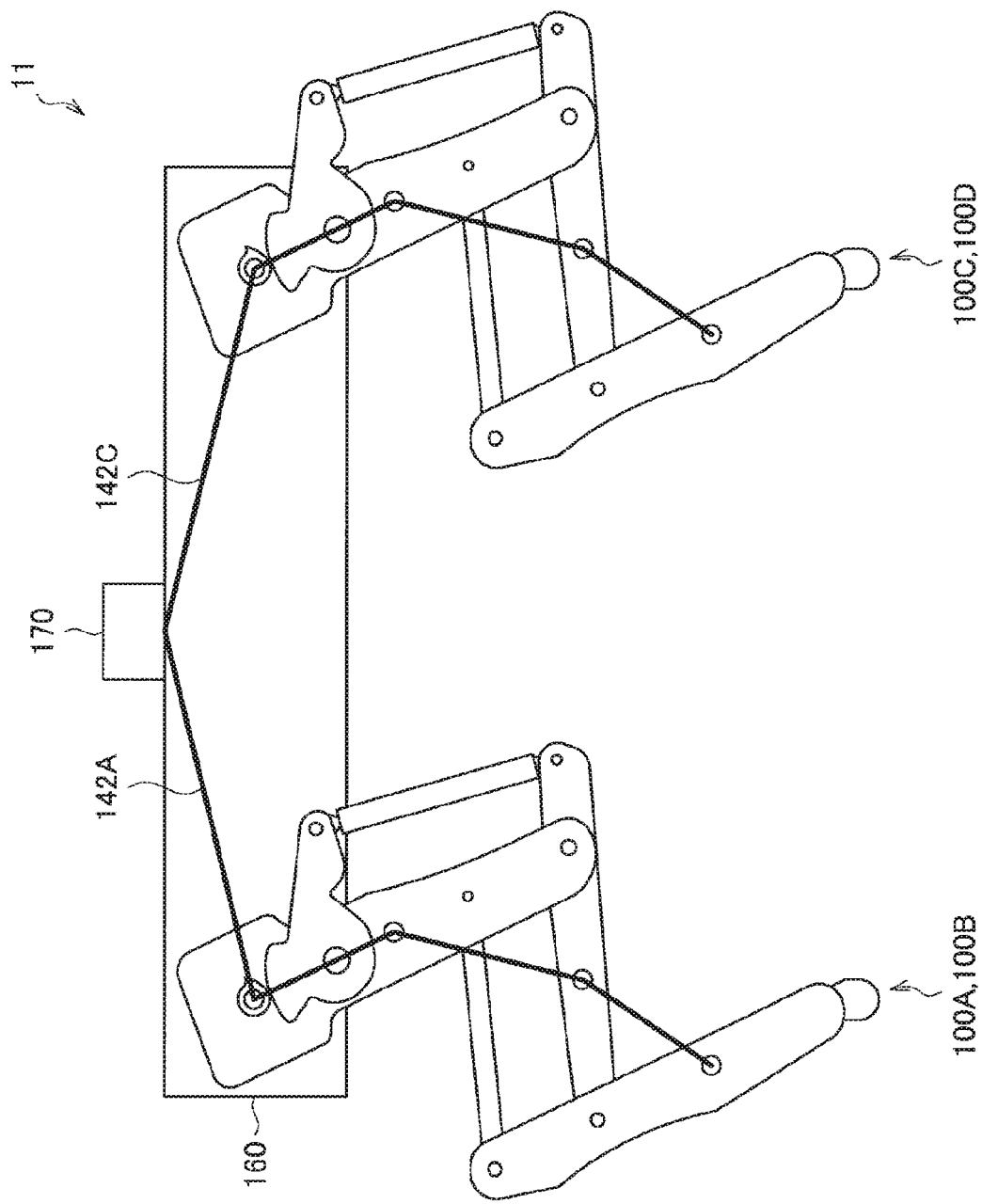
FIG. 10 is a schematic diagram illustrating a specific example of a walking movable body according to a specific example of the second embodiment.
Figure 11:
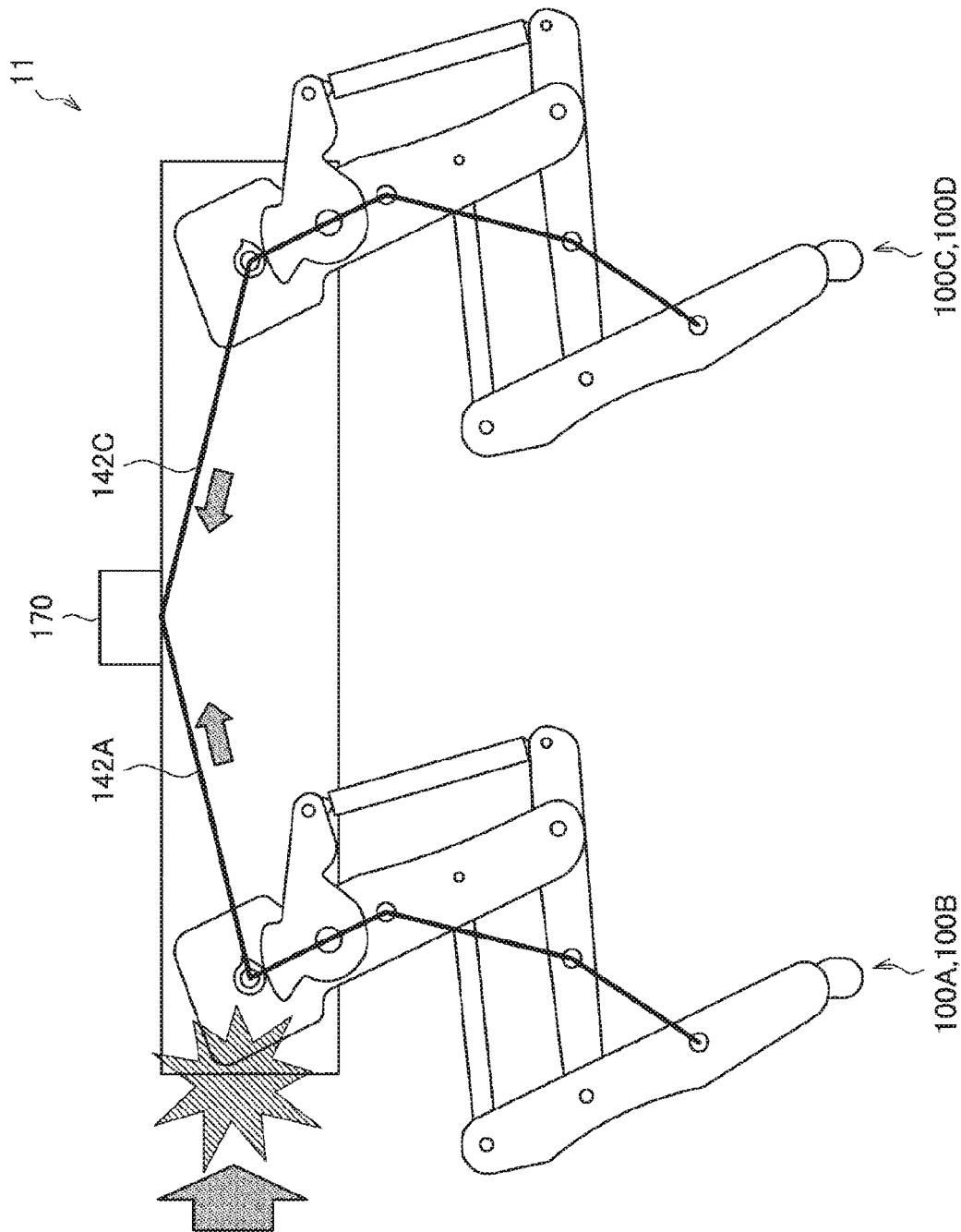
FIG. 11 is a schematic diagram illustrating a state in which an external force is applied to the walking movable body illustrated in FIG. 10.
Figure 12:
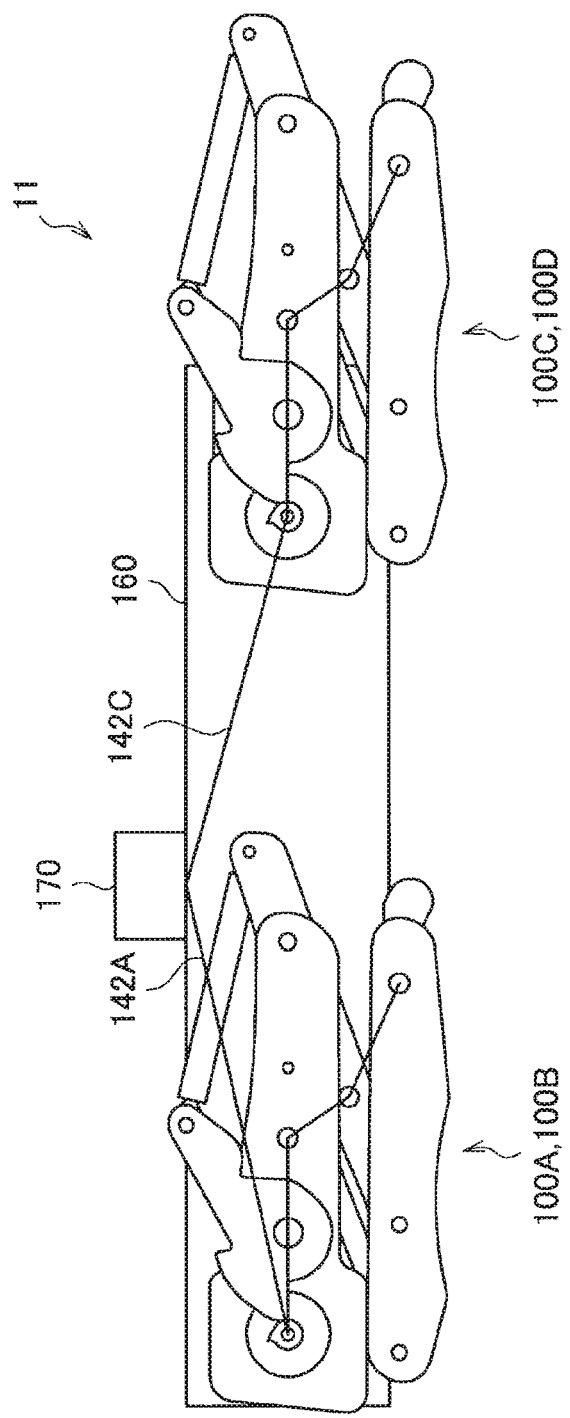
FIG. 12 is a schematic diagram illustrating a bending state of legs of the walking movable body illustrated in FIG. 11.

Subsequently, a specific example of the walking movable body according to the present embodiment will be described with reference to FIGS. 10 to 12. FIG. 10 is a schematic diagram illustrating a specific example of a walking movable body 11 according to the present embodiment. FIG. 11 is a schematic diagram illustrating a state where an external force is applied to the walking movable body 11 illustrated in FIG. 10. FIG. 12 is a schematic diagram illustrating a bending state of legs of the walking movable body 11 illustrated in FIG. 11.

As illustrated in FIG. 10, the walking movable body 11 according to the specific example includes a movable body main body 160, legs 100A, 100B, 100C, and 100D (collectively referred to as leg 101), and a limb control unit 170. For example, the walking movable body 11 is a four-legged walking robot device using the expansion device 10 according to the specific example illustrated in FIG. 4 as each of the legs 100A, 100B, 100C, and 100D. Note that, in FIGS. 10 to 12, the leg 100A and the leg 100B are described in an overlapping manner, and the leg 100C and the leg 100D are described in an overlapping manner. Therefore, the leg 100B exists on the back side of the leg 100A as viewing towards the paper surface, and the leg 100D exists on the back side of the leg 100C as viewing toward the paper surface.

The movable body main body 160 includes, for example, a control device which controls movement of each leg 101 of the walking movable body 11, a driving motor which drives each leg 101 of the walking movable body 11, and the like. The movable body main body 160 may include various sensors which measure various information regarding surrounding environment in order to control the movement of the walking movable body 11. Note that, in a case where the walking movable body 11 is used to transport goods, a good's storage and the like for mounting the goods may be provided in the movable body main body 160.

Each leg 101 is configured by the expansion device 10 illustrated in FIG. 4. Note that, since details of the configuration of the leg 101 is as described with reference to FIG. 4, the description is omitted here.

Each leg 101 includes linear members 142A, 142B (not illustrated), 142C, and 142D (not illustrated). These linear members 142A, 142B, 142C, and 142D are collectively referred to as linear members 142. One end of the linear member 142 is coupled to an end link on the front end side of each leg 101, and the other end is retracted to the movable body main body 160. Each linear member 142 is retracted to the movable body main body 160 under the control by the limb control unit 170 so that the state of each leg 101 is shifted to the bending state.

Note that, in the walking movable body 11, the tension applied to the linear member 142 so as to move each leg 101 closer to the movable body main body 160 can be generated by an elastic member which can store elastic energy such as a coil spring or a spiral spring, for example.

By controlling the retraction of the linear member 142 to the movable body main body 160, the limb control unit 170 controls the shift of the state of the leg 101 to the bending state. For example, in a case where it is determined that the walking movable body 1 falls, the limb control unit 170 may shift the state of each leg 101 to the bending state by retracting each linear member 142 to the movable body main body 160. Furthermore, when the walking movable body 1 is housed or transported, the limb control unit 170 may shift the state of each leg 101 to the bending state by retracting each linear member 142 to the movable body main body 160.

For example, as illustrated in FIG. 11, in a case where an external force or impact is applied to the walking movable body 11, the limb control unit 170 detects the external force or the impact by using a surface pressure sensor, a surface sensor, a geomagnetic sensor, a gyro sensor, an acceleration sensor, and the like. Thereafter, the limb control unit 170 determines whether or not the walking movable body 11 falls due to the detected external force or impact. In a case where the limb control unit 170 determines that the walking movable body 11 falls, the limb control unit 170 retracts each linear member 142 to the movable body main body 160 by various springs or various actuators. At this time, as described with reference to FIG. 4, in each leg 101, the links are interlocked and rotated by the link mechanism. Therefore, the link on the front end side of the leg 101 is moved closer to the movable body main body 160 by retracting the linear member 142 to the movable body main body 160.

With this operation, as illustrated in FIG. 12, the walking movable body 11 can shift the state of each leg 101 to the bending state. In the walking movable body 11 in which the state of each leg 101 is shifted to the bending state, the leg 101 does not protrude from the movable body main body 160. Therefore, even in a case where the walking movable body 11 falls, the moment applied to the leg 101 is reduced. With this structure, the walking movable body 11 can be deformed so that the leg 101 is less likely to be damaged or broken in a case where the walking movable body 11 falls. Furthermore, since the walking movable body 11 in which the state of each leg 101 is shifted to the bending state has a compact shape having a small housing volume, the walking movable body 11 can be easily housed or transported.

3. Summary

As described above, according to the first embodiment of the present disclosure, the expansion device 100 which can be quickly and easily deformed into a compact shape with a simple configuration such as the linear member 142 is proposed. Such an expansion device 100 can be deformed to a bent shape to which a small moment from the external force is applied when the external force and the like is applied. Therefore, it is possible to prevent the occurrence of the damage or breakage of the expansion device 100.

Furthermore, according to the second embodiment of the present disclosure, the walking movable body 1 including the expansion device 100 according to the first embodiment as the leg is proposed. Such a walking movable body 1 can be deformed into a shape in which the leg 101 is less likely to be damaged or broken when the walking movable body 1 falls. Furthermore, such a walking movable body 1 can be deformed into a compact shape which has a small housing volume and is suitable for housing and transportation. Such a walking movable body 1 can suppress the damage to the leg 101 due to falling and the like, for example, on a land with poor footing such as an irregular ground or mountains.

Note that the second embodiment of the present disclosure is not limited to the walking movable body described above. For example, the second embodiment of the present disclosure includes not only a movable body which moves by walking by using a plurality of legs but also a movable body which moves by a wheel and the like. For example, the movable body according to the second embodiment of the present disclosure may include a movable body which moves by driving wheels provided in the respective grounding portions of the legs and the like.

The preferred embodiments of the present disclosure have been described in detail above with reference to the drawings. However, the technical scope of the present disclosure is not limited to the examples. It is obvious that a person who has normal knowledge in the technical field of the present disclosure can arrive at various variations and modifications in the scope of the technical ideas described in claims. It is understood that the variations and modifications naturally belong to the technical scope of the present disclosure.

Furthermore, the effects described in the present specification are merely illustrative and exemplary and not limited. That is, the technology according to the present disclosure can exhibit other effects obvious to those skilled in the art from the description in the present specification together with or instead of the above described effects.

Note that the following configuration belongs to the technical scope of the present disclosure.

(1)

An expansion device including:
a main body; and
a limb portion attached to the main body, in which the limb portion includes:
a main link connected to the main body via a joint;
an end link provided at a front end of the limb portion;
at least one or more limb joints that are interposed between the main link and the end link and connect the main link and the end link; and
a linear member of which both ends couple an end at the front end side of the limb portion of the end link and the main body and are retractable to one or both of the end link and the main body.

(2)

The expansion device according to (1), in which
at least one or more intermediate links that connect the main link and the end link via at least one or more limb joints are further interposed between the main link and the end link.

(3)

The expansion device according to (2), in which
the linear member connects each of the intermediate links.

(4)

The expansion device according to (3), in which
each of the intermediate links has a shape extended in one direction, and
the linear member connects the each of the intermediate links at a midpoint of each intermediate link in a longitudinal direction.

(5)

The expansion device according to (3), in which
the linear member connects each of the intermediate links at a position where the linear member forms a straight line when the limb portion is in an extended state.

(6)

The expansion device according to any one of (2) to (5), in which
respective rotation shafts of the limb joints are parallel to each other.

(7)

The expansion device according to any one of (2) to (6), in which
the end link is arranged substantially parallel to the main link, and
the end link is connected to the main link by a plurality of the intermediate links facing each other so as to be rotatable in response to rotation of the main link.

(8)

The expansion device according to any one of (1) to (7), in which
one end of the linear member is provided to be retracted to the main body.

(9)

The expansion device according to (8), in which
the limb portion is in a bending state by retracting the linear member to the main body.

(10)
A movable body including:
a movable body main body; and
at least two or more limb portions attached to the movable body main body, in which
each of the limb portions includes:
a main link connected to the movable body main body via a joint;
an end link provided at a front end of the limb portion;
at least one or more limb joints that are interposed between the main link and the end link and connect the main link and the end link; and
a linear member of which both ends couple an end at the front end side of the limb portion of the end link and the movable body main body and are retractable to one or both of the end link and the movable body main body.

(11)
The movable body according to (10), in which
a direction of each rotation shaft of the limb joint is a roll direction or a pitch direction of the movable body.

(12)
The movable body according to (10) or (11), in which
one end of the linear member is provided to be retracted to the movable body main body.

(13)
The movable body according to (12), further including:
a limb control unit configured to retract the linear member to the movable body main body by applying tension to the linear member in a case where an external force is applied to the movable body.

(14)
The movable body according to (13), in which
the limb control unit retracts each of the linear members to the movable body main body by simultaneously applying the tension to each of the linear members of the limb portions.

(15)
The movable body according to any one of (12) to (14), in which
the limb control unit further includes a sensor unit that detects the external force to the movable body or a posture change of the movable body, and
the limb control unit retracts the linear member to the movable body main body on the basis of a detection result of the sensor unit.

(16)
The movable body according to any one of (10) to (15), in which
predetermined tension is constantly applied to the linear member.

(17)
The movable body according to (16), in which
the predetermined tension is applied by a spring.

(18)
The movable body according to any one of (10) to (15), in which
tension generated by a mechanism different from a driving motor for driving the limb portion is applied to the linear member.

REFERENCE SIGNS LIST

1 Walking movable body
100 Expansion device
101 Leg
111 First link
112 Second link
113 Third link
121 First limb joint
122 Second limb joint
123 Main body joint
131, 134 Connection point
132, 133, 135, 136 Guide
141 Grounding portion
142 Linear member
143 Main body
145 Limb portion
160 Movable body main body
170 Limb control unit
171 Input unit
173 Sensor unit
175 Deformation determination unit
177 Tension applying unit

The invention claimed is:

1. An expansion device, comprising:
a main body; and
a limb portion attached to the main body, wherein the limb portion includes:
a main link connected to the main body via a specific joint;
an end link at a front end of the limb portion;
at least one intermediate link between the main link and the end link;
a first limb joint;
a second limb joint, wherein
the first limb joint is between the end link and the at least one intermediate link,
the second limb joint is between the at least one intermediate link and the main link
the first limb joint and the second limb joint connect the main link and the end link,
the first limb joint is rotatable in a first direction, and
the second limb joint is rotatable in a second direction opposite to the first direction;
a first connection point on an end side of the end link, wherein the end side corresponds to a side of the end link opposite to the first limb joint;
a first guide at a midpoint position of the at least one intermediate link;
a second guide at a midpoint position of the main link;
a second connection point at a center position of the specific joint; and
a linear member that includes a first end and a second end, wherein
the first end and the second end of the linear member couple the main body to the end link,
the first end of the linear member is associated with the first connection point,
the second end of the linear member is associated with the second connection point,
the linear member passes through the first guide of the at least one intermediate link and the second guide of the main link, and
the first end and the second end of the linear member are retractable to at least one of the end link or the main body.

2. The expansion device according to claim 1, wherein the at least one intermediate link includes a first intermediate link and a second intermediate link.

3. The expansion device according to claim 2, wherein the first intermediate link has a shape extended in a third direction, and
the second intermediate link has a shape extended in the third direction.

4. The expansion device according to claim 1, wherein
the first limb joint includes a first rotation shaft,
the second limb joint includes a second rotation shaft, and
the first rotation shaft is parallel to the second rotation shaft.

5. The expansion device according to claim 1, wherein
an arrangement of the end link is parallel to the main link,
the end link is connected to the main link based on a plurality of intermediate links,
the plurality of intermediate links includes the at least one intermediate link,
the plurality of intermediate links faces each other, and
the end link is rotatable based on rotation of the main link.

6. The expansion device according to claim 1, wherein the first end of the linear member is retractable to the main body.

7. The expansion device according to claim 6, wherein the limb portion is in a bending state based on the retraction of the linear member to the main body.

* * * * *